United States Patent
Jeanmart et al.

[11] 3,759,924
[45] Sept. 18, 1973

[54] 1-AMINO-3(OR4)-PHENYL-3,4-DEHYDROISOQUINOLINES

[75] Inventors: Claude Jeanmart, Brunoy; Mayer Naoum Messer, Dievres; Pierre Simon, Hauts-de-Seine, all of France

[73] Assignee: Rhone-Poulenc S.A., Paris, France

[22] Filed: Mar. 11, 1971

[21] Appl. No.: 123,375

[30] Foreign Application Priority Data
Mar. 12, 1970 France .................. 7008932

[52] U.S. Cl. .... 260/286 R, 260/247.5, 260/268 BQ, 260/283.5, 260/283.5 Y, 260/286 Q, 260/288 A, 260/288 R, 424/248, 424/250, 424/258
[51] Int. Cl. ............................................. C07d 35/14
[58] Field of Search .................. 260/288 R, 288 A, 260/268 BQ, 286

[56] References Cited
UNITED STATES PATENTS

| | | | |
|---|---|---|---|
| 3,227,085 | 10/1966 | Aebi | 260/288 R |
| 3,577,424 | 5/1971 | Ehrhart | 260/288 R |
| 3,644,366 | 2/1972 | Jeanmart et al. | 260/288 R |
| 3,652,570 | 3/1972 | Gittos et al. | 260/288 R |

Primary Examiner—Donald G. Daus
Attorney—Stevens, Davis Miller & Mosher

[57] ABSTRACT 3,4-Dihydroisoquinoline derivatives of the formula:-

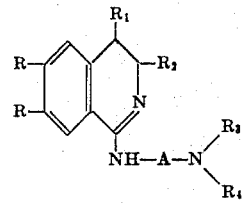

wherein the symbols R represent hydrogen, halogen or methoxy, or together form the methylenedioxy radical, the symbols $R_1$ and $R_2$ represent hydrogen or phenyl, at least one of the symbols $R_1$ and $R_2$ representing phenyl, the symbol A represents an alkylene radical, and (a) the symbols $R_3$ and $R_4$ represent alkyl, or (b) $R_3$ represents alkylene forming a nitrogen-containing heterocyclic ring by attachment to a carbon atom of the alkylene radical A, and $R_4$ represents alkyl, or (c) the symbols $R_3$ and $R_4$ together with the nitrogen atom form a mononuclear heterocyclic group optionally substituted by alkyl, are useful as anti-arhythmic agents.

9 Claims, No Drawings

1-AMINO-3(OR 4)-PHENYL-3,4-DEHYDROISOQUINOLINES

THIS INVENTION relates to new therapeutically useful derivatives of 3,4-dihydroisoquinoline, to a process for their preparation and pharmaceutical compositions containing them.

The new 3,4-dihydroisoquinoline derivatives of the present invention are those of the general formula:

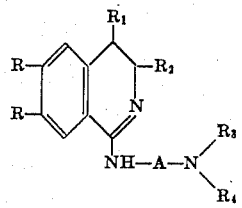

I (wherein the symbols R are the same or different and each represents a hydrogen or halogen atom or a methoxy radical or together form a methylenedioxy radical, preferably both symbols represent hydrogen atoms, the symbols $R_1$ and $R_2$ are the same or different and each represents a hydrogen atom or a phenyl radical, at least one of the symbols $R_1$ and $R_2$ representing a phenyl radical, the symbol A represents a straight- or branched-chain alkylene radical containing 1 to 5 carbon atoms, e.g. an ethylene or 2-methylethylene group, and (a) the symbols $R_3$ and $R_4$ are the same or different and each represents an alkyl radical containing 1 to 5 carbon atoms (preferably methyl or ethyl), or (b) $R_3$ represents an alkylene radical containing at most 5 carbon atoms forming a ring with at most 7 atoms in it by attachment to a carbon atom of the alkylene radical A, the ring being thus a nitrogen-containing heterocyclic ring, such as 2-piperidyl, 3-piperidyl or 4-piperidyl, and $R_4$ represents an alkyl radical containing 1 to 5 carbon atoms, an example of such a combination being 1-ethyl-3-piperidyl, or (c) the symbols $R_3$ and $R_4$ together with the nitrogen atom to which they are attached form a 5- or 6-membered mono-nuclear heterocyclic group, optionally containing a second hetero atom selected from nitrogen, oxygen and sulphur atoms, and optionally substituted by an alkyl radical containing 1 to 5 carbon atoms, such as 1-pyrrolidinyl, piperidino, morpholino or 4-methyl-1-piperazinyl) and acid addition and quaternary ammonium salts thereof. Preferred compounds of the invention are those in which one of $R_1$ and $R_2$ represents a hydrogen atom and the other represents a phenyl group, and especially 3-phenyl-1-[2-(1-pyrrolidinyl)-ethylamino]-3,4-dihydroisoquinoline and acid addition and quaternary ammonium salts thereof.

According to a feature of the invention, the 3,4-dihydroisoquinoline derivatives of general formula I are obtained by the process which comprises reaction of an amine of the general formula:

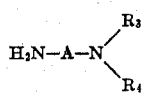

II (wherein A, $R_3$ and $R_4$ are as hereinbefore defined) with a 3,4-dihydroisoquinoline derivative of the general formula:

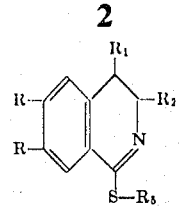

III (wherein R, $R_1$ and $R_2$ are as hereinbefore defined, and $R_5$ represents an alkyl radical containing 1 to 3 carbon atoms, preferably the methyl radical) or an acid addition salt thereof, preferably the hydriodide.

When the 3,4-dihydroisoquinoline starting material of general formula III is used in the form of the free base, the reaction is preferably effected by heating the reactants in an inert organic solvent, such as ethanol, toluene or dimethylformamide, at a temperature between 50° C. and the boiling point of the reaction mixture. It is particularly advantageous to carry out the reaction under an inert atmosphere such as a nitrogen atmosphere. The reaction is generally complete after a period of heating of between 10 and 30

When the starting material of general formula III is used in the form of an acid addition salt, it is preferable to carry out the reaction in an alcohol, for example ethanol, and at a temperature between 50° and 80° C. for 30 minutes to 10 hours.

The 3,4-dihydroisoquinoline derivatives of general formula III can be prepared by cyclisation of an isothiocyanate of the general formula:

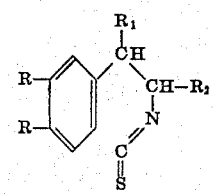

IV (wherein R, $R_1$ and $R_2$ are as hereinbefore defined), followed by S-alkylation by methods known per se of the resulting 1,2,3,4-tetrahydroisoquinoline-1-thione. By the term "methods known per se" as used in this specification is meant methods heretofore used or described in the chemical literature. The cyclisation of the isothiocyanate is generally carried out by heating in sulphuric acid or polyphosphoric acid, or by the action of aluminium chloride in n-heptane.

The 3,4-dihydroisoquinoline derivatives of general formula I obtained by the aforementioned process can be purified by physical methods such as distillation, crystallisation or chromatography, or by chemical methods such as the formation of salts, crystallisation of the salts and decomposition of them in an alkaline medium. In carrying out the said chemical methods the nature of the anion of the salt is immaterial, the only requirement being that the salt must be well-defined and readily crystallisable.

The 3,4-dihydroisoquinoline derivatives of general formula I may be converted by methods known per se into acid addition and quaternary ammonium salts. The acid addition salts may be obtained by the action of acids on the dihydroisoquinoline derivatives in appropriate solvents. As organic solvents there may be used alcohols, ketones, ethers or chlorinated hydrocarbons. The salt which is formed is precipitated, if necessary after concentration of the solution, and is isolated by filtration or decantation. The quaternary ammonium salts may be obtained by the action of esters on the dihydroisoquinoline bases, optionally in an organic solvent, at room temperature or, more rapidly, with gentle heating.

The 3,4-dihydroisoquinoline derivatives of the present invention, and their acid addition and quaternary ammonium salts, possess interesting pharmacodynamic properties; they are very active as anti-arythmic agents. In vitro, at concentrations of between 1 and 10 mg./litre, they have proved active in a study of the prolongation of the refractory period of the isolated auricles of the rabbit [G.S. Dawes, Brit. J. Pharmacol., 1, 90 (1946)]. In vivo, the products have proved active in rabbits against electrocardiographic abnormalities caused by aconitine, and in guinea pigs against the cardiac toxicity of ouabain [A. Seyika and E.M. Vaughan Williams, Brit. J. Pharmacol., 21, 462 (1963)] at doses of between 0.5 and 10 mg./kg. animal body weight administered intravenously.

For therapeutic purposes, the 3,4-dihydroisoquinoline derivatives of general formula I may be employed as such or in the form of non-toxic acid addition salts, i.e., salts containing anions which are relatively innocuous to the animal organism in therapeutic doses of the salts (such as hydrochlorides, sulphates, nitrates, phosphates, acetates, propionates, succinates, benzoates, fumarates, maleates, tartrates, theophyllineacetates, salicylates, phenolphthalinates and methylene-bis-β-hydroxynaphthoates) so that the beneficial physiological properties inherent in the bases are not vitiated by side-effects ascribable to the anions. However, they may also be employed in the form of non-toxic quaternary ammonium salts obtained by re-action with organic halides e.g. methyl, ethyl, allyl or benzyl chloride, bromide or iodide, or other reactive esters, e.g. methyl- or ethyl-sulphates, benzene sulphonates or toluene-p-sulphonates.

The following Examples illustrate the invention.

EXAMPLE 1

A solution of 1-methylthio-3-phenyl-3,4-dihydroisoquinoline hydriodide (14.8 g.), 96 percent 2-diethylamino-propylamine (5.6 g.) and 7.8N hydriodic acid (5.5 cc.) in ethanol (85 cc.) is heated under reflux for 2 hours. A product crystallises, and is filtered off and washed with ethanol (10 cc.) and then with diethyl ether (3 × 10 cc.). 1-(2-Diethylaminopropylamino)-3-phenyl-3,4-dihydroisoquinoline dihydriodide (17.1 g.), melting at about 140° C. with decomposition, is thus obtained.

2-Diethylaminopropylamine can be prepared according to V. Prelog, Helv. Chim. Acta, 26, 1172 (1943).

1-Methylthio-3-phenyl-3,4-dihydroisoquinoline hydriodide can be prepared as follows:

A solution of 3-phenyl-1,2,3,4-tetrahydroisoquinoline-1-thione (74.4 g.) and methyl iodide (66.2 g.) in acetone (600 cc.) is heated under reflux for 2 hours. A product crystallises, and is filtered off and washed with acetone (100 cc.) and then with diethyl ether (100 cc.). 1-Methylthio-3-phenyl-3,4-dihydroisoquinoline hydriodide (109.2 g.), melting at 190°–200° C. with decomposition, is thus obtained.

The 3-phenyl-1,2,3,4-tetrahydroisoquinoline-1-thione can be obtained by cyclisation of 1-isothiocyanato-1,2-diphenylethane (438 g.) in concentrated sulphuric acid (d = 1.83; 2200 g.) for 1 hour at 55° C. The mixture is poured into water (2000 cc.), ground ice (400 g.) and methylene chloride (2000 cc.). The organic phase is separated and the aqueous phase is extracted with methylene chloride (2 × 2000 cc.).

The combined organic phases are washed successively with water (2000 cc.), a 4 percent (w/v) aqueous sodium bicarbonate solution (2000 cc.), and water (2000 cc.), and then dried over sodium sulphate. After filtration, the solvent is evaporated under reduced pressure (30 mm.Hg). The residue (187 g.) is dissolved in benzene (1800 cc.), and the solution is poured into a column, 7.5 cm. in diameter, containing silica (1800 g.). Elution with benzene containing 10 percent (v/v) of ethyl acetate (5400 cc.) yields 3-phenyl-1,2,3,4-tetrahydroisoquinoline-1-thione (95 g.) melting at 135°–138° C.

1-Isothiocyanato-1,2-diphenylethane can be prepared according to I.A. Kaye and C.L. Parris, J. Amer. Chem. Soc., 74, 1566 (1952).

EXAMPLE 2

A solution of 1-methylthio-3-phenyl-3,4-dihydroisoquinoline hydriodide (7.6 g.), 92 percent 1-(2-aminoethyl)-pyrrolidine (2.7 g.) and 7.8N hydriodic acid (2.9 cc.) in ethanol (45 cc.) is heated under reflux for 2 hours. The product which crystallises is filtered off and washed with diethyl ether (2 × 10 cc.). 3-Phenyl-1-[2-(1-pyrrolidinyl)-ethylamino]-3,4-dihydroisoquinoline dihydriodide (9.6 g.), melting at 196° C., is thus obtained.

1-(2-aminoethyl)-pyrrolidine can be prepared according to J. Van Alphen, Rec. Trav. Chim., 58, 1105 (1939).

EXAMPLE 3

A solution of 1-methylthio-3-phenyl-3,4-dihydroisoquinoline hydriodide (14.8 g.), 2-diethylaminoethylamine (5 g.) and 7.8N hydriodic acid (5.5 cc.) in ethanol (85 cc.) is heated under reflux for 2 hours. The product which crystallises is filtered off and washed with ethanol (10 cc.) and then with acetone (2 × 20 cc.). 1-(2-Diethylamino-ethylamino)-3-phenyl-3,4-dihydroisoquinoline dihydriodide (17.2 g.), melting at 212° C., is thus obtained.

EXAMPLE 4

A solution of 1-methylthio-4-phenyl-3,4-dihydroisoquinoline hydriodide (38.1 g.), 1-ethyl-3-aminopiperidine (14.1 g.) and 7.8N hydriodic acid (14.1 cc.) in ethanol (500 cc.) is heated under reflux for 9 hours. The solvent is evaporated under reduced pressure (30 mm.Hg) and the residue obtained is treated with water (250 cc.), 10N sodium hydroxide solution (100 cc.) and methylene chloride (250 cc.). The aqueous phase is decanted and then extracted with methylene chloride (300 cc.). The combined organic phases are extracted with N methanesulphonic acid (450 cc.). The acid extracts are made alkaline by addition of 10N sodium hydroxide solution (100 cc.), and the oil which separates is extracted with methylene chloride (450 cc.). The organic phase is separated, washed with distilled water (100 cc.) and dried over sodium sulphate. Evaporation of the solvent under reduced pressure (30 mm.Hg) yields a yellow oil (14 g.). This oil is dissolved in ethyl acetate (120 cc.) and the solution obtained is treated with decolourising charcoal (0.2 g.) and then filtered. Maleic acid (4.1 g.) dissolved in ethyl acetate (120 cc.)

is added to this solution. The product which crystallises is filtered off and washed with diethyl ether (50 cc.). A product (15.5 g.) is thus obtained, which after two recrystallisations from methyl ethyl ketone (250 cc. followed by 150 cc.) yields 1-(1-ethyl-3-piperidyl)-amino-4-phenyl-3,4-dihydroisoquinoline maleate (11.2 g.), melting at 160° C.

1-Methylthio-4-phenyl-3,4-dihydroisoquinoline hydriodide can be prepared by heating a solution of 4-phenyl-1,2,3,4-tetrahydroisoquinoline-1-thione (155.6 g.) and methyl iodide (61 cc.) in acetone (1300 cc.) under reflux for one hour. The product which crystallises is filtered off, washed with acetone (100 cc.) and diethyl ether (100 cc.) and dried. 1-Methylthio-4-phenyl-3,4-dihydroisoquinoline hydriodide (130.4 g.), melting at 185° C., is thus obtained.

4-Phenyl-1,2,3,4-tetrahydroisoquinoline-1-thione can be prepared by adding 1,1-diphenyl-2-isothiocyanatoethane (472 g.) to 97 percent sulphuric acid (1400 cc.) maintained at 30° C., and stirring for a further hour at 40° C. Thereafter, the reaction mixture is poured into a mixture of distilled water (3000 cc.) and ice (3.5 kg.). The product which precipitates is extracted with methylene chloride (6000 cc.). The organic phase is separated, successively washed with distilled water (2000 cc.), N sodium hydroxide solution (2000 cc.) and distilled water (4000 cc.), dried over sodium sulphate, treated with decolourising charcoal (20 g.) and then filtered. Thereafter, the solvent is evaporated under reduced pressure (30 mm.Hg). The product obtained is treated with isopropanol (3000 cc.) under reflux. A yellow insoluble material is separated by filtration, the filtrate is then treated with decolourising charcoal (20 g.). After filtration and cooling, an orange product crystallises and is filtered off, washed with isopropanol (100 cc.) and then with diisopropyl ether (300 cc.), and dried. 4-Phenyl-1,2,3,4-tetrahydroisoquinoline-1-thione (155.6 g.), melting at 128° C., is thus obtained.

1,1-Diphenyl-2-isothiocyanatoethane can be prepared by adding 10N sodium hydroxide solution (580 cc.) to a vigorously stirred mixture of 2,2-diphenylethylamine hydrochloride (474 g.) dissolved in distilled water (5000 cc.) and of thiophosgene (164 cc.) dissolved in methylene chloride (2500 cc.). During the addition of the sodium hydroxide solution, the temperature is kept at about 10° C. and the pH is kept at below 8. The mixture is stirred for a further hour at about 3° C., the organic phase is then separated, and the aqueous phase is again extracted with methylene chloride (2 × 750 cc.). The organic phases are successively washed with N hydrochloric acid (750 cc.), distilled water (750 cc.), saturated aqueous sodium bicarbonate solution (750 cc.) and distilled water (2 × 750 cc.). After drying the solution over sodium sulphate and treatment with decolourising charcoal (30 g.), the solvent is evaporated under reduced pressure (30 mm.Hg). 1,1-Diphenyl-2-isothiocyanatoethane (477 g.) is thus obtained.

1,1-Diphenylethylamine can be prepared according to the process described by H. Lettre and H. Wick, Ann. 603, 189 (1957).

1-Ethyl-3-aminopiperidine can be prepared according to the process described by M. Asano and K. Tomita, J. Pharm. Soc. Japan, 68, 224 (1948).

EXAMPLE 5

A solution of 1-methylthio-4-phenyl-3,4-dihydroisoquinoline hydriodide (20 g.), 2-diethylaminopropylamine (7.6 g.) and 7.8N hydriodic acid (7.5 cc.) in ethanol (200 cc.) is heated under reflux for 2 hours. On cooling, a white product crystallises, and is filtered off and washed with ethanol (10 cc.) and diethyl ether (60 cc.). A product (23.2 g.) melting, with decomposition, at between 175° and 180° C. is thus obtained. After recrystallisation from ethanol (140 cc.), 1-(2-diethylaminopropylamino)-4-phenyl-3,4-dihydroisoquinoline dihydriodide (12.1 g.), melting at 175° C. with decomposition, is obtained.

2-Diethylaminopropylamine can be prepared according to V. Prelog, Helv. Chim. Acta, 26, 1172 (1943).

The present invention includes within its scope pharmaceutical compositions containing, as active ingredient, at least one of the 3,4-dihydroisoquinoline derivatives of general formula I, or a non-toxic acid addition or quaternary ammonium salt thereof, in association with a pharmaceutical carrier or coating. The invention includes especially such preparations made up for oral, parenteral or rectal administration or local application, e.g. as ointments.

Solid compositions for oral administration include tablets, pills, powders, and granules. In such solid compositions the active compound is admixed with at least one inert diluent such as sucrose, lactose or starch. The compositions may also comprise, as is normal practice, additional substances other than inert diluents, e.g. lubricating agents, such as magnesium stearate. Liquid compositions for oral administration include pharmaceutically-acceptable emulsions, solutions, suspensions, syrups and elixirs containing inert diluents commonly used in the art, such as water and liquid paraffin. Besides inert diluents such compositions may also comprise adjuvants, such as wetting, emulsifying and suspending agents, and sweetening, flavouring and aromatizing agents. The compositions according to the invention, for oral administration, also include capsules of absorbable material such as gelatin containing the active substance with or without the addition of diluents or excipients.

Preparations according to the invention for parenteral administration include sterile aqueous or non-aqueous solutions, suspensions or emulsions. Examples of non-aqueous solvents or vehicles are propylene glycol, polyethylene glycol, vegetable oils, such as olive oil, and injectable organic esters such as ethyl oleate. These compositions may also contain adjuvants such as preserving, wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

Compositions for rectal administration are suppositories which contain, in addition to the active substance, excipients such as cacao butter or a suitable wax base.

The percentage of active ingredient in the compositions of the invention may be varied, it being necessary that it should constitute a proportion such that a suitable dosage shall be obtained. The dosage depends on the desired therapeutic effect, on the route of administration and on the duration of the treatment. In human therapy the compositions when administered orally to an adult should generally give doses between 100 mg. and 1000 mg. of active substance per day.

The following Example illustrates pharmaceutical compositions according to the invention.

EXAMPLE 6

Tablets containing 25 mg. of active product and having the following composition are prepared according to the usual technique:

| | |
|---|---|
| 3-phenyl-1-[2-(1-pyrrolidinyl)-ethylamino]-3,4-dihydroisoquinoline dihydriodide | 0.045 g. |
| starch | 0.080 g. |
| precipitated silica | 0.022 g. |
| magnesium stearate | 0.003 g. |

We claim:

1. A 3,4-dihydroisoquinoline of the formula:

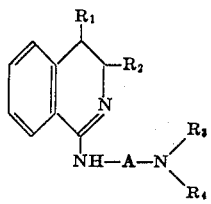

wherein one of $R_1$ and $R_2$ is hydrogen and the other is phenyl, A is alkylene of 1 to 5 carbon atoms, and (a) $R_3$ and $R_4$ are each alkyl of 1 to 5 carbon atoms, or (b) $R_3$ is alkylene forming a 2-piperidyl, 3-piperidyl, or 4-piperidyl ring by attachment to a carbon atom of the alkylene A, and $R_4$ is alkyl of 1 to 5 carbon atoms, or (c) $R_3$ and $R_4$ together with the nitrogen atom to which they are attached form a 1-pyrrolidinyl group, and non-toxic acid addition salts thereof.

2. A 3,4-dihydroisoquinoline according to claim 1 wherein A is ethylene or 2-methyl-ethylene.

3. A 3,4-dihydroisoquinoline according to Claim 1 wherein each of $R_3$ and $R_4$ is methyl or ethyl.

4. A 3,4-dihydroisoquinoline according to Claim 1 wherein $R_3$ is alkylene attached to a carbon atom of the alkylene radical A to form a 3-piperidyl ring and $R_4$ is ethyl."

5. 3-Phenyl-1-[2-(1-pyrrolidinyl)-ethylamino]-3,4-dihydroisoquinoline and non-toxic acid addition salts thereof.

6. 1-(2-Diethylaminopropylamino)-3-phenyl-3,4-dihydroisoquinoline, and non-toxic acid addition salts thereof.

7. 1-(2-Diethylaminoethylamino)-3-phenyl-3,4-dihydroisoquinoline and non-toxic acid addition salts thereof.

8. 1-(1-Ethyl-3-piperidyl)amino-4-phenyl-3,4-dihydroisoquinoline and non-toxic acid addition salts thereof.

9. 1-(2-Diethylaminopropylamino)-4-phenyl-3,4-dihydroisoquinoline and non-toxic acid addition salts thereof.

* * * * *